US010967993B2

(12) United States Patent
Martín Llorente

(10) Patent No.: US 10,967,993 B2
(45) Date of Patent: Apr. 6, 2021

(54) PAYLOAD ADAPTER RING

(71) Applicant: AIRBUS DEFENCE AND SPACE S.A., Madrid (ES)

(72) Inventor: Joaquín Martín Llorente, Madrid (ES)

(73) Assignee: AIRBUS DEFENCE AND SPACE S.A., Madrid (ES)

( * ) Notice: Subject to any disclaimer, the term of this patent is extended or adjusted under 35 U.S.C. 154(b) by 318 days.

(21) Appl. No.: 16/063,580

(22) PCT Filed: Dec. 18, 2015

(86) PCT No.: PCT/ES2015/070926
§ 371 (c)(1),
(2) Date: Jun. 18, 2018

(87) PCT Pub. No.: WO2017/103297
PCT Pub. Date: Jun. 22, 2017

(65) Prior Publication Data
US 2019/0002134 A1    Jan. 3, 2019

(51) Int. Cl.
*B64G 1/64* (2006.01)
(52) U.S. Cl.
CPC ........ *B64G 1/641* (2013.01); *B64G 2001/643* (2013.01)
(58) Field of Classification Search
CPC .... B64G 1/641; B64G 1/64; B64G 2001/643; B64G 2001/1092
See application file for complete search history.

(56) References Cited

U.S. PATENT DOCUMENTS

| 5,613,653 | A | 3/1997 | Bombled et al. | |
| 8,393,582 | B1 | 3/2013 | Kutter et al. | |
| 8,720,830 | B1 | 5/2014 | Szatkowski | |
| 8,789,797 | B2 | 7/2014 | Darooka | |
| 2012/0012711 | A1* | 1/2012 | Ross | B64G 1/641 244/158.2 |
| 2014/0131521 | A1 | 5/2014 | Apland et al. | |
| 2017/0096240 | A1* | 4/2017 | Cook | B64G 1/641 |
| 2019/0161215 | A1* | 5/2019 | Cosner | B64G 1/641 |

FOREIGN PATENT DOCUMENTS

EP    2407384 A1    1/2012

OTHER PUBLICATIONS

International Search Report and Written Opinion for Application No. PCT/ES2015/070926 dated Aug. 22, 2016 (9 pages).
Maly, J.R. et al., "Adapter Ring for Small Satellites on Responsive Launch Vehicles", 7th Response Space Conference, Apr. 27-30, 2009, Los Angeles, CA, (10 pages).

* cited by examiner

*Primary Examiner* — Rodney A Bonnette
(74) *Attorney, Agent, or Firm* — Michael Best & Friedrich LLP

(57) ABSTRACT

A lightweight spacecraft dispenser, which consists of a material made from composite materials, and of a ring structure with several payload ports. The ring structure has a surface that extends between opposite ends of the ring structure and that is at least partially spherical. The surface can be completely spherical or partially spherical between the opposite ends.

3 Claims, 2 Drawing Sheets

PAYLOAD ADAPTER RING

BACKGROUND OF THE INVENTION

The present invention relates to a lightweight spacecraft dispenser, especially for launching small satellites.

The demand for small spacecraft launches requires effective, reliable and affordable multiple launch systems, which must avoid possible risks to the primary spacecraft.

Currently there are manufacturers that deliver turn-key launch systems for small spacecraft in the range from 20 kg to 300 kg (micro and mini-satellites). Various systems are already known which refer to distributors or dispensers for small satellites.

There is a system called ESPA ("EELV Secondary Payload Adapter"; EELV standing for "Evolved Expendable Launch Vehicle"), developed by CSA Engineering, Inc., that uses a metallic ring concept, based on a thick monolithic aluminium alloy cylinder, with several ports, and which was first built in 2001. The article "Adapter Ring for Small Satellites on Responsive Launch Vehicles" (Joseph R. Maly, Vann M. Stavast, Gregory E. Sandford, Michael E. Evert, CSA Engineering, Inc.; 7th Responsive Space Conference, Apr. 27-30, 2009, Los Angeles, Calif.), describes a modular multi-payload adapter for small launch vehicles based on the ESPA ring U.S. Pat. No. 8,789,797 B2 refers to "Payload adapters including antenna assemblies, satellite assemblies and related systems and methods". It discloses a payload adapter with a ring structure having an opening. A circular sidewall extends between opposite ends of the ring structure, and the ring structure may include several payload ports.

EP 2407384 B1, referred to a "Dual evolved expendable launch vehicle (EELV) secondary payload adaptor (ESPA) port small satellite design", discloses an apparatus and a method that provide payload volume for larger satellites. In one or more embodiments, the apparatus and method include a plurality of small satellite components, a payload adaptor ring, and at least one pivoting hinge system. In at least one embodiment, the plurality of small satellite components includes at least one payload, one bus, and/or one solar panel. The small satellite components are mounted on the payload adaptor ring. At least one pivoting hinge system connects together at least two of the small satellite components. Upon deployment of the small satellite components from the payload adaptor ring, at least one pivoting hinge system combines together at least two small satellite components, thereby creating at least one single larger satellite.

U.S. Pat. No. 8,720,830 B1, referred to an "Efficient Solar Panel Wing-Stowage on a Space Launch Vehicle", discloses an adapter assembly for interconnection with a launch vehicle, which comprises a structure with an adapter. Generally, the adapter assembly is positioned between two separable components of a launch vehicle along a longitudinal axis of the launch vehicle to structurally interconnect the components. In an embodiment, a solar panel having a stowed state and a deployed state is interconnected to the adapter assembly. In a stowed state, the solar panel can be positioned within the interior space of the adapter assembly to utilize space within the launch vehicle that would otherwise not be fully utilized.

U.S. Pat. No. 5,613,653 A refers to a "Multisatellite distributor for launcher", and discloses a distributor held in the upper stage of a satellite launcher. The launcher has an outer protection surface. Satellites are clustered around a central hub and placed symmetrically at angular intervals and at two levels. The satellites are held in place on the central hub by interface units, which have mechanical fixing/release mechanisms and electrical interfaces between the satellite and launcher.

Although there are several launch systems for small spacecraft, there is a need to provide alternative dispensers which allow a better adaptation to standard mechanisms.

SUMMARY OF THE INVENTION

Therefore, the object of the invention is to provide a lightweight spacecraft dispenser that solves the above-mentioned drawback.

The invention relates to provide a lightweight spacecraft dispenser which consists of a ring structure with several payload ports, characterized in that the surface of the ring structure is at least partially spherical.

The main advantage of this configuration is that the shape change allows a better fixing of the small satellites or spacecraft to be launched.

Other features and advantages of the present invention will become apparent from the following detailed description of illustrative non-limiting embodiments of its object in relation to the accompanying figures.

DETAILED DESCRIPTION

Figure 1:
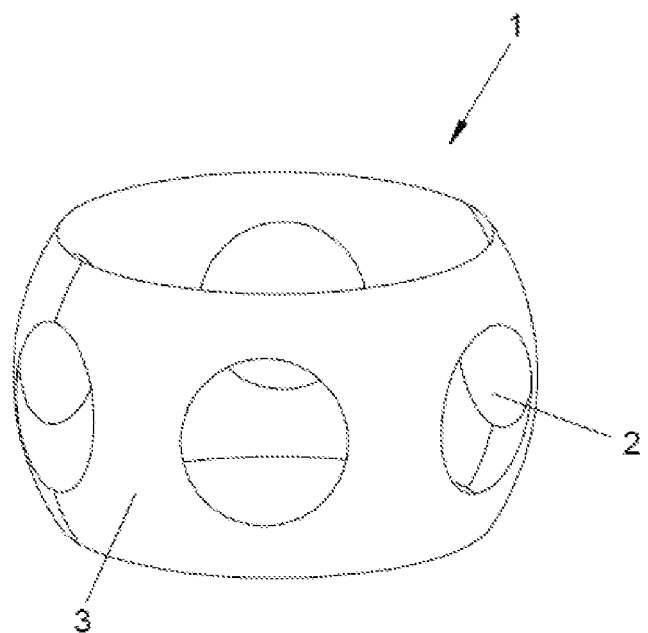
FIG. 1 shows a perspective view of a lightweight spacecraft dispenser of the invention.

FIG. 1 shows a lightweight spacecraft dispenser 1 which consists of a ring structure with several payload ports 2. The ring structure has two opposite ends, and a surface 3 extends between these two opposite ends.

The surface 3 of the lightweight spacecraft dispenser 1 can be at least partially spherical. In the embodiment of FIG. 1, the surface 3 of the lightweight spacecraft dispenser 1 is completely spherical.

Figure 2:
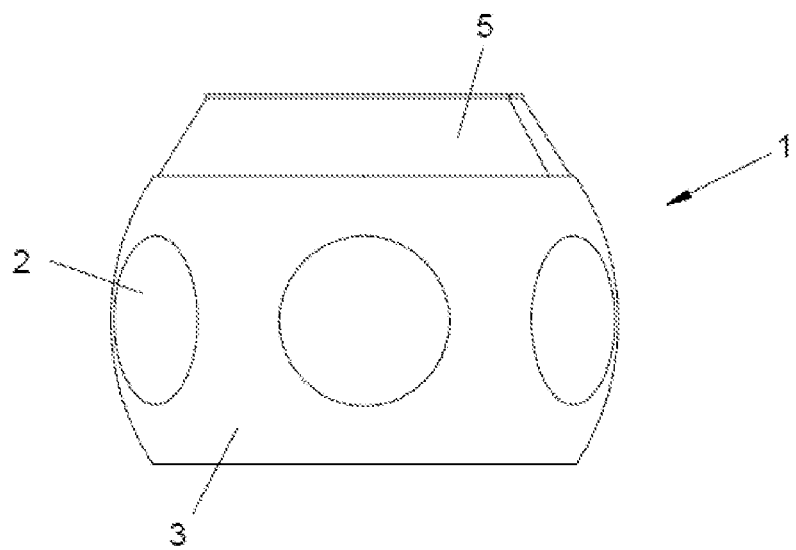
FIG. 2 shows a perspective view of another embodiment of a lightweight spacecraft dispenser of the invention.

FIG. 2 shows a lightweight spacecraft dispenser 1. An adaptor 5 is placed on one of the ends of the ring structure.

Figure 3:
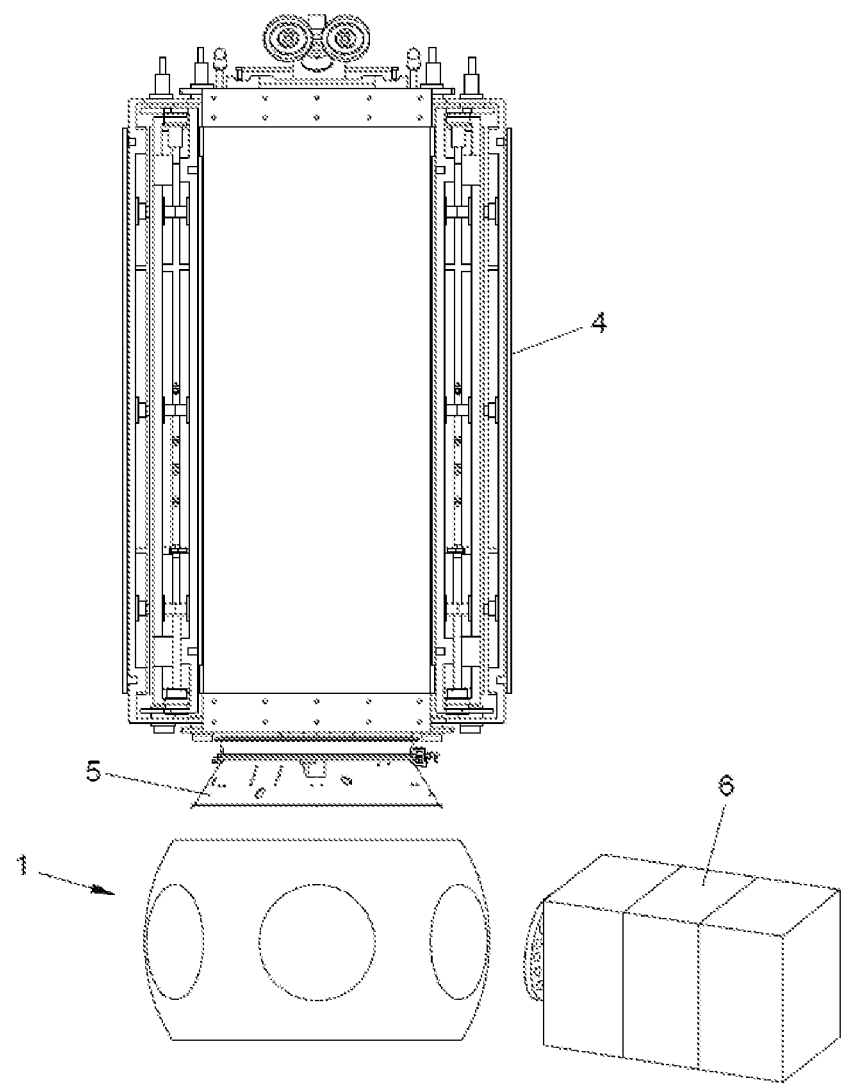
FIG. 3 shows a view of a primary spacecraft mounted on a lightweight spacecraft dispenser of the invention.

FIG. 3 shows a primary spacecraft 4 mounted on the lightweight spacecraft dispenser 1 of FIG. 2. In FIG. 3 it can also be seen that the adaptor 5 is connected to the primary spacecraft 4, and can have a tapered shape. FIG. 3 also shows a small satellite 6, which can be coupled in its corresponding payload port 2.

According to another embodiment, the payload ports 2 comprise secondary mounts with flanges.

The use of composites for manufacturing the spacecraft dispenser 1 allows for weight reduction. For instance, an ESPA configuration of a height of 1,05 m and 6 ports of 610 mm of diameter weights about 168 kg. For a configuration according to the invention (for instance, using Epoxy/M40J) the weight would be about 120 kg.

By using composite materials, the dispenser 1 can provide an important mass reduction with respect to the existing ESPA ring concept dispensers. That allows a potential increase in the spacecraft masses.

Also, the use of automatic manufacturing techniques (such as AFP, Automated Fiber Placement) for composites would allow for cost reduction.

Although the present invention has been fully described in connection with preferred embodiments, it is apparent that modifications may be introduced within its scope, not considering this as limited by these embodiments, but by the content of the following claims.

The invention claimed is:

1. A lightweight spacecraft dispenser consisting of:
a material made from composite materials; and
a ring structure including a plurality of payload ports and a surface that extends between opposite ends of the ring structure and that is at least partially spherical.

2. The lightweight spacecraft dispenser of claim 1, wherein the ring structure is an integral composite material structure.

3. The lightweight spacecraft dispenser of claim 1, wherein the ring structure includes an adapter on an end of the ring structure.

* * * * *